(12) United States Patent
Fujii et al.

(10) Patent No.: US 11,378,181 B2
(45) Date of Patent: Jul. 5, 2022

(54) TEMPERATURE ESTIMATION DEVICE FOR FRICTION ENGAGING ELEMENT

(71) Applicant: TOYOTA JIDOSHA KABUSHIKI KAISHA, Toyota (JP)

(72) Inventors: Kota Fujii, Nisshin (JP); Atsushi Tabata, Okazaki (JP); Koichi Okuda, Toyota (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/345,333

(22) Filed: Jun. 11, 2021

(65) Prior Publication Data
US 2022/0042595 A1    Feb. 10, 2022

(30) Foreign Application Priority Data
Aug. 6, 2020    (JP) .............................. JP2020-133953

(51) Int. Cl.
*F16H 59/72*    (2006.01)
*F16H 61/06*    (2006.01)

(52) U.S. Cl.
CPC ........... *F16H 59/72* (2013.01); *F16H 61/061* (2013.01); *F16H 2059/725* (2013.01); *F16H 2061/062* (2013.01); *F16H 2342/044* (2013.01)

(58) Field of Classification Search
CPC .................. F16H 59/72; F16H 61/061; F16H 2059/725; F16H 2061/062; F16H 2342/044
See application file for complete search history.

(56) References Cited

U.S. PATENT DOCUMENTS

| | | | | |
|---|---|---|---|---|
| 9,026,295 | B2* | 5/2015 | Inoue ................... | B60W 20/40 701/22 |
| 2009/0082174 | A1* | 3/2009 | Ikeda ...................... | F16H 59/72 477/98 |
| 2012/0173103 | A1* | 7/2012 | Barbir .................... | F16D 48/06 701/67 |

FOREIGN PATENT DOCUMENTS

| | | | |
|---|---|---|---|
| JP | 2018135977 A | * 8/2018 | |
| JP | 2018-204768 A | 12/2018 | |
| WO | WO-2018123670 A1 | * 7/2018 | ............. F16D 25/12 |

\* cited by examiner

*Primary Examiner* — Justin Holmes
(74) *Attorney, Agent, or Firm* — Oliff PLC

(57) ABSTRACT

A temperature estimation device for friction engaging elements including an execution device and a storage device is provided. The storage device stores mapping data that defines mapping. The mapping includes, as an input variable, a heat amount variable that is a variable indicating an amount of heat generated by the friction engaging elements during the shifting of the transmission and a shifting variable indicating the friction engaging elements to be engaged at the time of the shifting of the transmission, and, as an output variable, the temperature. The execution device executes an acquisition process of acquiring a value of the input variable and a calculation process of inputting the value of the input variable acquired by the acquisition process into the mapping to calculate a value of the output variable.

6 Claims, 4 Drawing Sheets

TEMPERATURE ESTIMATION DEVICE FOR FRICTION ENGAGING ELEMENT

CROSS-REFERENCE TO RELATED APPLICATION

This application claims priority to Japanese Patent Application No. 2020-133953 filed on Aug. 6, 2020, incorporated herein by reference in its entirety.

BACKGROUND

1. Technical Field

The present disclosure relates to a temperature estimation device for a friction engaging element.

2. Description of Related Art

Japanese Unexamined Patent Application Publication No. 2018-204768 (JP 2018-204768 A) describes a device for estimating the temperature of a friction engaging element provided in a transmission.

SUMMARY

When a plurality of such friction engaging elements is provided, it is desired to accurately estimate the temperature of each friction engaging element.

The present disclosure relates to a device that is applied to a vehicle provided with a transmission including a plurality of friction engaging elements that operate with hydraulic pressure, and that estimates a temperature of the friction engaging elements at a time of shifting of the transmission. An aspect of the present disclosure includes an execution device and a storage device. The storage device is configured to store mapping data that defines mapping. The mapping includes, as an input variable, a heat amount variable and a shifting variable, and, as an output variable, the temperature, the heat amount variable being a variable indicating an amount of heat generated by the friction engaging elements during the shifting of the transmission and the shifting variable indicating the friction engaging elements to be engaged at the time of the shifting of the transmission. The execution device is configured to execute an acquisition process of acquiring a value of the input variable and a calculation process of inputting the value of the input variable acquired by the acquisition process into the mapping to calculate a value of the output variable.

According to the temperature estimation device for the friction engaging element of the above aspect, the amount of heat generated by the friction engaging element during the shifting is used as an input variable, and the input variable is input to the mapping defined by the mapping data to calculate the temperature of the friction engaging element. Here, the heat capacity of the friction engaging elements differs from each other. Further, the cooling effect of the friction engaging elements differs from each other when the friction engaging elements are cooled by hydraulic oil or the like. Thus, the temperature characteristics showing the relationship between the heat generation amount and the temperature change in the friction engaging elements are different for each friction engaging element. In view of this, the input variable includes the shifting variable indicating the friction engaging element that is engaged at the time of the shifting of the transmission. Therefore, the output variable is calculated in consideration of the temperature characteristics of each friction engaging element, which improves the temperature estimation accuracy for each friction engaging element.

In the temperature estimation device of the above aspect, the input variable may include a time variable that is a variable indicating a shifting interval, the shifting interval being a time from a previous engagement start timing of the friction engaging elements for which the temperature is calculated to a current engagement start timing.

The temperature of the friction engaging element rises from the start of the engagement to the completion of the engagement, however, after the engagement is completed, the temperature decreases through cooling with hydraulic oil or the like, and eventually converges to a constant temperature. Here, when the shifting interval is shortened by repeating the shifting, the engagement may be started again while the temperature of the friction engaging element is decreasing after the engagement is completed. In this case, as compared with the case where the shifting interval is long and the engagement is started from the state where the temperature of the friction engaging element has converged to a constant temperature, since the temperature of the friction engaging element at the start of the engagement is high, the temperature of the friction engaging element at the time of the shifting is also high. When the above shifting interval is different in this way, the temperature of the friction engaging elements at the start of the engagement is different, so that the temperature of the friction engaging elements at the time of the shifting is also different. In this regard, according to the temperature estimation device having the above configuration, since the input variable includes a time variable indicating the shifting interval, the temperature of the friction engaging element is calculated in consideration of the influence of the shifting interval on the temperature of the friction engaging element at the start of the engagement. Therefore, the temperature can be calculated with higher accuracy as compared with the case where the time variable is not included in the input variable.

In the temperature estimation device of the above aspect, the heat amount variable may include a speed variable and a hydraulic pressure variable. Here, the speed variable may be a variable indicating a relative rotation speed of members of the friction engaging elements that rotate relative to each other during the shifting of the transmission. The hydraulic pressure variable may be a variable indicating the hydraulic pressure supplied to the friction engaging elements during the shifting of the transmission.

The higher the relative rotation speed between members of the friction engaging elements that rotate relative to each other, the larger the heat generation amount of the friction engaging elements. Further, the higher the hydraulic pressure supplied to the friction engaging elements during the shifting, the larger the heat generation amount of the friction engaging elements. Thus, according to the temperature estimation device having the above configuration, the speed variable indicating the relative rotation speed related to the amount of heat generated in the friction engaging elements during the shifting and the hydraulic pressure variable indicating the hydraulic pressure are used as heat amount variables, and these heat amount variables are input to the mapping defined by the mapping data to calculate the temperature of the friction engaging elements. Therefore, the temperature of the friction engaging element can be estimated accurately.

In the temperature estimation device having the above configuration, the heat amount variable may include an oil temperature variable that is a variable indicating a temperature of a hydraulic oil supplied to the friction engaging elements.

When the temperature of the hydraulic oil changes, the atmospheric temperature of the friction engaging element and the cooling effect of the hydraulic oil change, so that the heat generation amount of the friction engaging element changes. Thus, according to the temperature estimation device having the above configuration, since the oil temperature variable is included in the heat amount variable, the temperature of the friction engaging element is calculated in consideration of the influence of the temperature of the hydraulic oil on the heat generation amount. Therefore, the temperature can be calculated with higher accuracy as compared with the case where the oil temperature variable is not included in the heat amount variable.

In the temperature estimation device having the above configuration, the hydraulic pressure supplied to the friction engaging elements may be changed such that the higher an output torque of a prime mover of the vehicle, the higher the hydraulic pressure. The heat amount variable may include a torque variable that is a variable indicating the output torque.

According to the temperature estimation device having the above configuration, when the output torque of the prime mover is large, for example, in a situation where sudden acceleration is required, an increase in the hydraulic pressure shortens the time required for the friction engaging elements to change from the released state to the engaged state, which shortens the time required for the shifting and enables quick shifting. Here, when the hydraulic pressure is variably set in accordance with the output torque in this way, the magnitude of the output torque is related to the heat generation amount of the friction engaging element. In this respect, in the above configuration, since the torque variable is included in the heat amount variable, the temperature of the friction engaging element is calculated in consideration of the influence of the output torque on the heat generation amount. Therefore, the temperature can be calculated with higher accuracy as compared with the case where the torque variable is not included in the heat amount variable.

In the temperature estimation device having the above configuration, the torque variable may be a command value of torque to be applied to a drive wheel of the vehicle, and the torque variable may be an accelerator operation amount of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
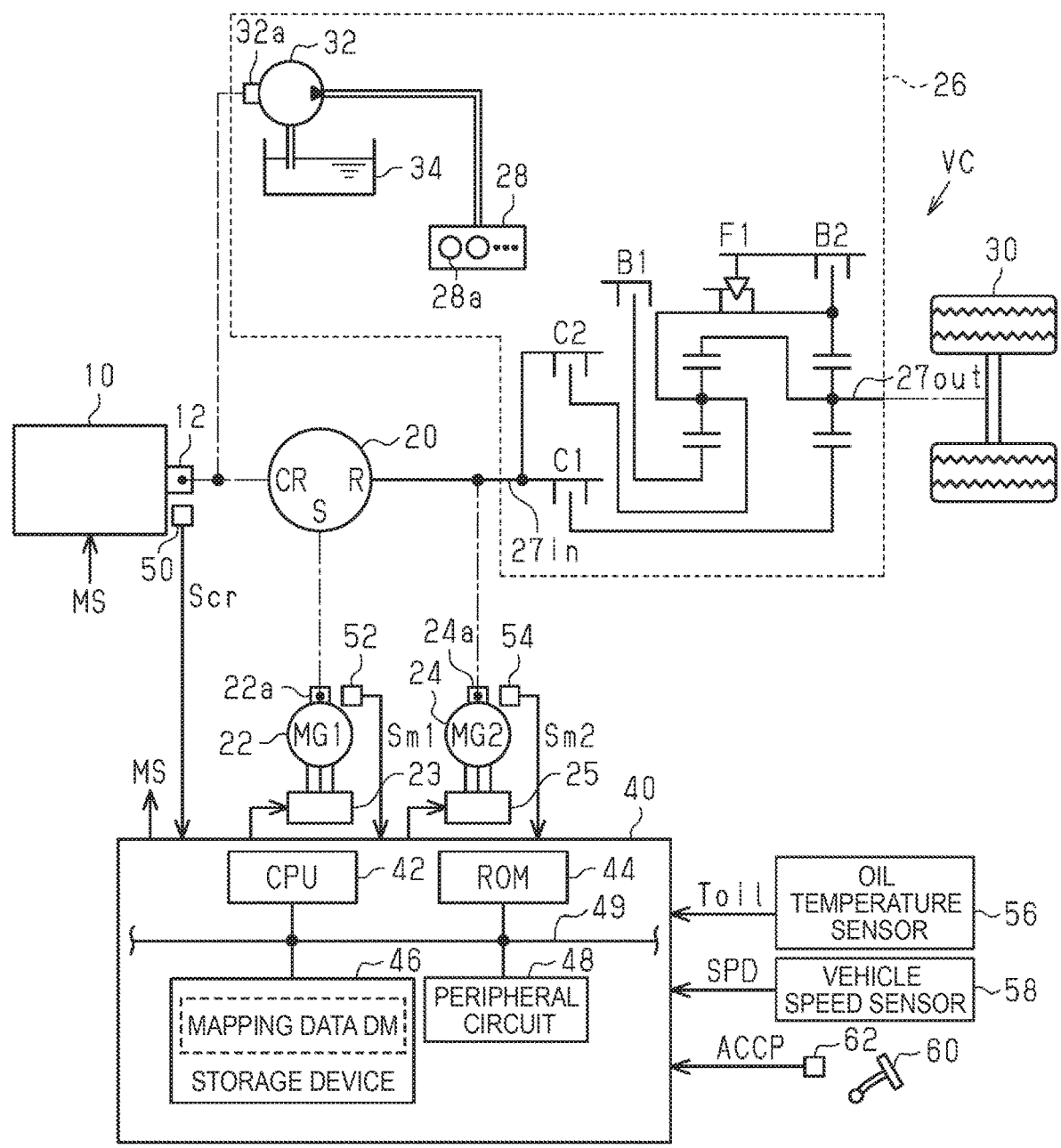
FIG. 1 is a diagram showing a configuration of a temperature estimation device for a friction engaging element according to an embodiment as an example of the present disclosure.

Hereinafter, an embodiment related to a temperature estimation device that estimates a temperature of a friction engaging element of the present disclosure will be described with reference to FIGS. 1 to 7. As shown in FIG. 1, a vehicle VC includes an internal combustion engine 10, a first motor generator 22, and a second motor generator 24 as prime movers.

A power split device 20 is mechanically connected to a crankshaft 12 of the internal combustion engine 10. The power split device 20 divides the power of the internal combustion engine 10, the first motor generator 22, and the second motor generator 24. The power split device 20 includes a planetary gear mechanism. The crankshaft 12 is mechanically connected to a carrier CR of the planetary gear mechanism, a rotation shaft 22a of the first motor generator 22 is mechanically connected to a sun gear S, and a rotation shaft 24a of the second motor generator 24 and an input shaft 27 in of an automatic transmission 26 as an example of a transmission of the present embodiment are mechanically connected to a ring gear R. The output voltage of a first inverter 23 is applied to the terminal of the first motor generator 22. The output voltage of a second inverter 25 is applied to the terminal of the second motor generator 24.

The automatic transmission 26 is a multi-stage transmission equipped with a plurality of friction engaging elements that operates with hydraulic pressure such as a first clutch C1, a second clutch C2, a first brake B1, and a second brake B2, a plurality of planetary gear mechanisms, and a one-way clutch F1. In the automatic transmission 26, the shifting stage can be switched by the combination of the engaged state and the released state of the first clutch C1, the second clutch C2, the first brake B1, and the second brake B2, and the combination of the rotation restricted state and the rotation allowable state switched by the one-way clutch F1. The automatic transmission 26 of the present embodiment is a transmission having four forward speeds and one reverse speed, however, the number of gears can be changed as appropriate.

The basic structure of the friction engaging elements is almost the same and is a well-known structure. That is, in the friction engaging element, a first plate and a second plate that rotate relative to each other are alternately arranged, and a friction material is attached to one of the plates. When no hydraulic pressure is supplied to the friction engaging element, the first plate and the second plate are separated from each other, and torque transmission between the first plate and the second plate is cut off.

On the other hand, when hydraulic pressure is supplied to the friction engaging element, the pack clearance PCtc, which is the clearance between the first plate and the second plate, is closed, which brings the friction engaging element into the state immediately before the start of engagement, that is, a packed state. When further hydraulic pressure is supplied after this packing is completed, the first plate and the second plate start to engage with each other, so that the relative rotation speed of the first plate and the second plate gradually decreases and the torque capacity of the friction engaging element increases. Finally, when the relative rotation speed between the first plate and the second plate becomes "zero", the friction engaging element is in a completely engaged state.

Drive wheels 30 are mechanically connected to an output shaft 27 out of the automatic transmission 26. Further, a driven shaft 32a of an oil pump 32 is mechanically connected to the carrier CR. The oil pump 32 is a pump that circulates the oil in an oil pan 34 as lubricating oil to the power split device 20 and supplies the oil to the automatic transmission 26 as hydraulic oil. The pressure of the hydraulic oil discharged from the oil pump 32 is adjusted by a hydraulic pressure control circuit 28 in the automatic transmission 26, and the hydraulic oil is used as, for example, hydraulic oil for supplying hydraulic pressure to the friction engaging element. The hydraulic pressure control circuit 28 includes a plurality of solenoid valves 28a, and is a circuit that controls the flow state of the hydraulic oil and the hydraulic pressure of the hydraulic oil by energizing each of the solenoid valves 28a.

A control device 40 controls the internal combustion engine 10 and operates various operation units of the internal combustion engine 10 in order to control torque, an exhaust component ratio, and the like, which are control amounts thereof. Further, the control device 40 controls the first motor generator 22 and operates the first inverter 23 in order to control torque, rotation speed, and the like, which are control amounts thereof. Further, the control device 40 controls the second motor generator 24 and operates the second inverter 25 in order to control torque, rotation speed, and the like, which are control amounts thereof.

When the control device 40 controls the above control amounts, the control device 40 references the output signal Scr of a crank angle sensor 50, the output signal Sm1 of a first rotation angle sensor 52 that detects the rotation angle of the rotation shaft 22a of the first motor generator 22, and the output signal Sm2 of a second rotation angle sensor 54 that detects the rotation angle of the rotation shaft 24a of the second motor generator 24. Further, the control device 40 references the oil temperature Toil that is the temperature of the hydraulic oil detected by an oil temperature sensor 56, the vehicle speed SPD detected by a vehicle speed sensor 58, and the accelerator operation amount ACCP that is a depression amount of an accelerator pedal 60 detected by an accelerator sensor 62.

The control device 40 includes a central processing unit (CPU) 42, a read only memory (ROM) 44, a storage device 46 that is an electrically rewritable non-volatile memory, and a peripheral circuit 48, which can communicate with each other via a local network 49. Here, the peripheral circuit 48 includes a circuit that generates a clock signal that defines the internal operation, a power supply circuit, a reset circuit, and the like. The control device 40 controls the control amounts when the CPU 42 executes the program stored in the ROM 44. The CPU 42 and the ROM 44 constitute an execution device.

Figure 2:
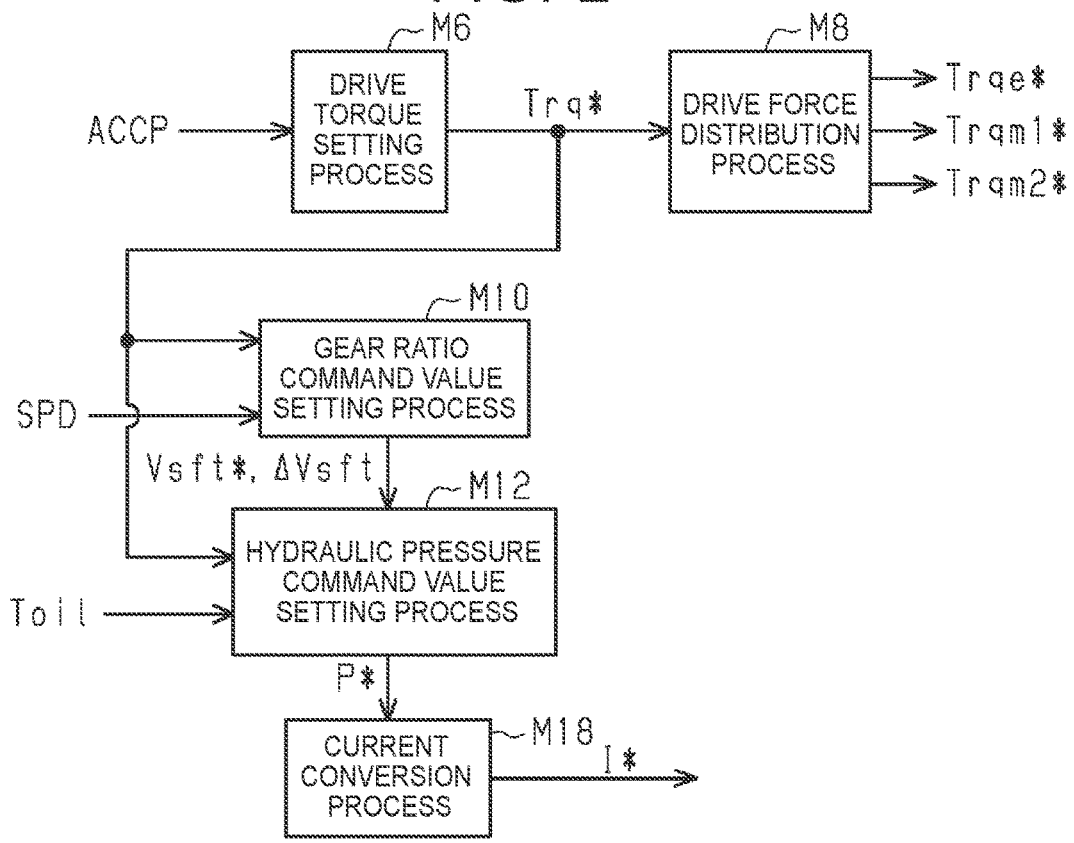
FIG. 2 is a block diagram showing a process executed by a control device according to the embodiment.

FIG. 2 shows a process executed by the control device 40. The process shown in FIG. 2 is realized when the CPU 42 repeatedly executes the program stored in the ROM 44, for example, at a predetermined cycle.

The drive torque setting process M6 is a process of receiving the accelerator operation amount ACCP as an input and calculating the drive torque command value Trq*, which is a command value of the torque to be applied to the drive wheels 30, to a larger value when the accelerator operation amount ACCP is large as compared to when the accelerator operation amount ACCP is small.

The drive force distribution process M8 is a process of setting, based on the drive torque command value Trq*, the torque command value Trqe* for the internal combustion engine 10, the torque command value Trqm1* for the first motor generator 22, and the torque command value Trqm2* for the second motor generator 24. The torque corresponding to these torque command values Trqe*, Trqm1*, and Trqm2* is generated by the internal combustion engine 10, the first motor generator 22, and the second motor generator 24, respectively, so that the torque applied to the drive wheels 30 is the value corresponding to the drive torque command value Trq*.

In the gear ratio command value setting process M10, the gear ratio command value Vsft*, which is the command value of the gear ratio of the automatic transmission 26, and a switching variable ΔVsft indicating whether the gear ratio is upshifted or downshifted are set based on the drive torque command value Trq* and the vehicle speed SPD. Therefore, for example, when the gear ratio command value Vsft* indicates third gear and the switching variable ΔVsft indicates the upshifting, it indicates that the type of shifting is switching from third gear to fourth gear. The gear ratio command value Vsft* and the switching variable ΔVsft are shifting variables indicating the friction engaging element that is engaged at the time of shifting.

The hydraulic pressure command value setting process M12 calculates the oil pressure command value P0*, which is the base value of the command value of the hydraulic pressure adjusted by the solenoid valves used for switching, based on the drive torque command value Trq*, the oil temperature Toil, and the gear ratio command value Vsft* and the switching variable ΔVsft when the gear ratio is switched. This hydraulic pressure command value setting process M12 is realized when the CPU 42 performs a map calculation of the hydraulic command value P0* in a state where the map data in which the drive torque command value Trq*, the gear ratio command value Vsft*, the switching variable ΔVsft, and the oil temperature Toil are input variables, and the oil pressure command value P0* is an output variable is stored in the ROM 44 in advance. When the drive torque command value Trq* is large, for example, in a situation where sudden acceleration is required, the time required for the friction engaging element to change from the released state to the engaged state is shortened by increasing the hydraulic pressure, which shortens the time required for the shifting and enables quick shifting. Therefore, when the drive torque command value Trq* is large, the calculated hydraulic pressure command value P0* is set to a higher hydraulic pressure than when the drive torque command value Trq* is small. Further, the hydraulic pressure command value setting process M12 calculates the final hydraulic pressure command value P* by correcting the hydraulic pressure command value P0* with various values.

The current conversion process M18 is a process of converting the hydraulic pressure command value P* into the current command value I*, which is the command value of the current flowing through the solenoid valves 28a. When the value of the gear ratio command value Vsft* changes, the control device 40 changes the current command value I* of the solenoid valves 28a corresponding to the friction engaging element whose engagement is started in accordance with the gear ratio command value Vsft* and the switching variable ΔVsft, so that the friction engaging element is switched from the released state to the engaged state.

The control device 40 of the present embodiment executes a process of estimating the temperature Tk of the friction engaging element that is engaged at the time of the shifting. Hereinafter, this estimation process will be described. The control device 40 that executes the following processes constitutes a temperature estimation device for the friction engaging element.

Figure 3:
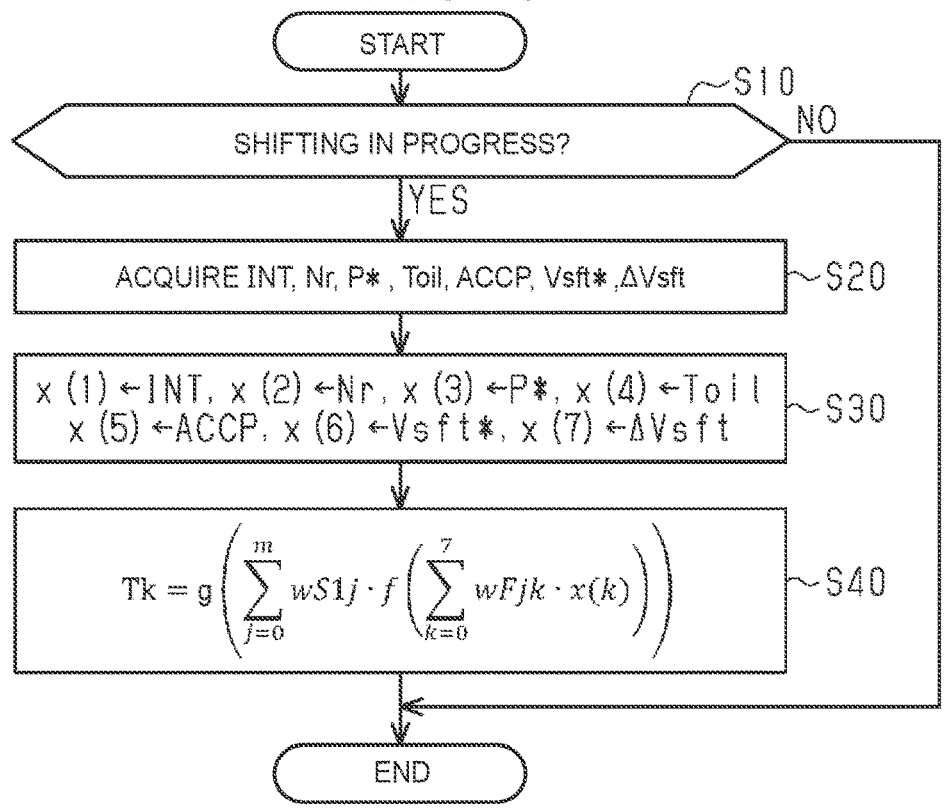
FIG. 3 is a flowchart showing a procedure of a process executed by the control device according to the embodiment.

FIG. 3 shows a procedure of a process executed by the control device 40 according to the present embodiment. The process shown in FIG. 3 is realized when the CPU 42 repeatedly executes the program stored in the ROM 44, for example, at a predetermined cycle. Note that, in the following, the step number of each process is represented by a number with "S" added at the beginning.

In the series of processes shown in FIG. 3, the CPU 42 first determines whether the shifting is in progress (S10). Then, when it is determined that the shifting is not in progress, the CPU 42 temporarily ends this process.

On the other hand, when it is determined that the shifting is in progress, the CPU 42 executes an acquisition process for acquiring various values (S20). Specifically, the shifting interval INT, the relative rotation speed Nr, the hydraulic pressure command value P*, the oil temperature Toil, the accelerator operation amount ACCP, the gear ratio command value Vsft*, and the switching variable ΔVsft are acquired.

Figure 4:
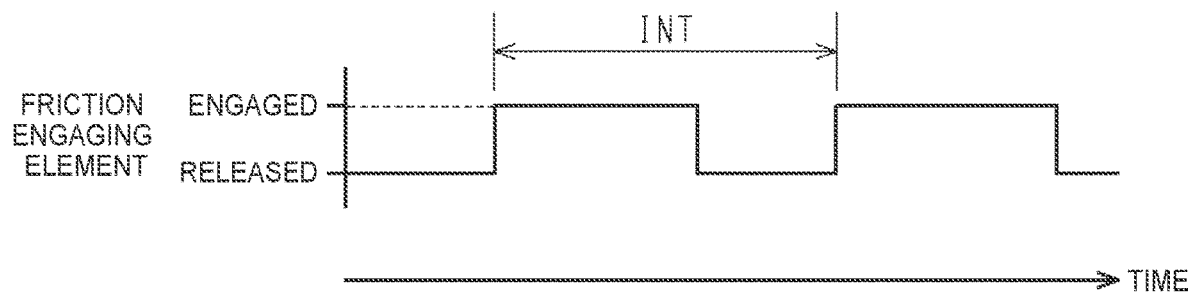
FIG. 4 is a time chart showing a shifting interval of the embodiment.

As shown in FIG. 4, the shifting interval INT is the time from the previous engagement start timing of the friction engaging element for which the temperature Tk is calculated, that is, the friction engaging element that is engaged in the current shifting, to the current engagement start timing.

The relative rotation speed Nr is the relative rotation speed of the first plate and the second plate of the friction engaging element that rotate relative to each other during the shifting of the automatic transmission 26, and is the difference between the input shaft rotation speed Nin and the "output shaft rotation speed Nout×gear ratio after shifting". The CPU 42 calculates the output shaft rotation speed Nout based on the vehicle speed SPD. Further, the gear ratio command value Vsft* is substituted as the "gear ratio after shifting".

Next, the CPU 42 substitutes each value acquired in the process of S20 into the input variables to be input to the mapping defined by the mapping data DM stored in the storage device 46 (S30). That is, the CPU 42 substitutes the shifting interval INT into the input variable x(1), substitutes the relative rotation speed Nr into the input variable x(2), substitutes the hydraulic pressure command value P* into the input variable x(3), substitutes the oil temperature Toil into the input variable x(4), substitutes the accelerator operation amount ACCP into the input variable x(5), substitutes the gear ratio command value Vsft* into the input variable x(6), and substitutes the switching variable ΔVsft into the input variable x(7).

In the present embodiment, the input variable x(1) is a time variable indicating the shifting interval INT. The input variable x(2) is a speed variable indicating the relative rotation speed Nr. The input variable x(3) is a hydraulic pressure variable indicating the hydraulic pressure supplied to the friction engaging element during the shifting of the automatic transmission 26. The input variable x(4) is an oil temperature variable indicating the temperature of the hydraulic oil supplied to the friction engaging element. The input variable x(5) is a torque variable indicating the output torque of the prime mover of the vehicle VC. Since the accelerator operation amount ACCP is a value related to the output torque of the prime mover, in the present embodiment, the accelerator operation amount ACCP is adopted as a torque variable, but the drive torque command value Trq* may be adopted as this torque variable. The input variable x(6) and the input variable x(7) are shifting variables indicating the friction engaging element that is engaged at the time of the shifting. The input variable x(2), the input variable x(3), the input variable x(4), and the input variable x(5) are heat amount variables indicating the amount of heat generated by the friction engaging element during the shifting of the automatic transmission 26.

Next, the CPU 42 substitutes the input variables x(1), x(2), x(3), x(4), x(5), x(6), and x(7) into the mapping to execute the calculation process for calculating the temperature Tk, which is an output variable (S40), and temporarily ends this process.

In the present embodiment, a function approximator is exemplified as the mapping, and more specifically, a fully connected forward propagation type neural network having one intermediate layer is exemplified. Specifically, the values of the nodes in the intermediate layer are determined by substituting, into the activation function f, each of the "m" values of the input variables x(1) to x(7) into which the values are substituted in the process of S40 and the input variable x(0) serving as a bias parameter, which are converted by the linear mapping defined by the coefficient wFjk (j=1 to m, k=0 to 7). Further, the value of the temperature Tk that is the output variable is determined by substituting the values obtained by converting each of the values of the nodes in the intermediate layer into the activation function g based on the linear mapping defined by the coefficient wS1j. In the present embodiment, a hyperbolic tangent is exemplified as the activation function f. In addition, the ReLU function is exemplified as the activation function g.

The mapping data DM is a trained model trained before being mounted on the vehicle VC using a vehicle having the same specifications as the vehicle VC or a power transmission device including the internal combustion engine 10, the first motor generator 22, the second motor generator 24, the power split device 20, the automatic transmission 26, and the oil pump 32. That is, the input variables when the state of the power transmission device is set variously are acquired, and the temperatures Tk at that time are measured. The training data is generated in this way, and the mapping data DM is trained based on the training data. It is assumed that the training is completed when the difference between the value of the temperature Tk that is an output variable output by the mapping data DM and the value of the training data is equal to or less than a predetermined value, and the mapping data DM that is the trained model is stored in the storage device 46.

Next, operations and effects of the present embodiment will be described. (i) FIG. 5 shows the temperature characteristics showing the relationship between the magnitude of the heat generation amount Qs generated in each friction engaging element such as the first clutch C1, the second clutch C2, the first brake B1, and the second brake B2 from the start to the end of engagement, and the rising temperature ΔT of the friction engaging element in the engaging process.

Figure 5:
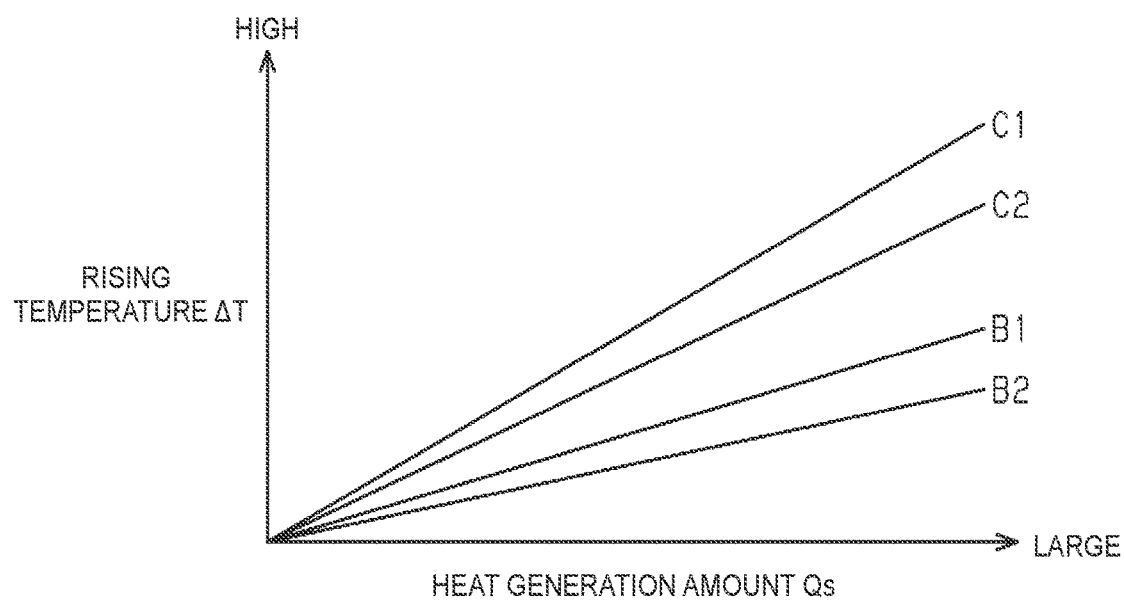
FIG. 5 is a graph showing the relationship between the heat generation amount and the rising temperature of each friction engaging element.

As shown in FIG. 5, the temperature characteristics are different for each friction engaging element. This is because the heat capacity of the friction engaging elements is different from each other, and the cooling effect of the friction engaging elements is different from each other when the friction engaging elements are cooled by hydraulic oil or the like.

Therefore, in the present embodiment, the heat amount variable indicating the amount of heat generated by the friction engaging element during the shifting is used as an input variable, and the input variable is input to the mapping defined by the mapping data DM to calculate the temperature Tk of the friction engaging element. In the calculation, the shifting variable indicating the friction engaging element that is engaged at the time of the shifting of the automatic transmission 26, that is, the gear ratio command value Vsft* and the switching variable ΔVsft are included in the input variables. Thus, the temperature Tk that is the output variable is calculated in consideration of the temperature characteristics of each friction engaging element. Therefore, the estimation accuracy of the temperature Tk is improved for each friction engaging element.

Figure 6A:
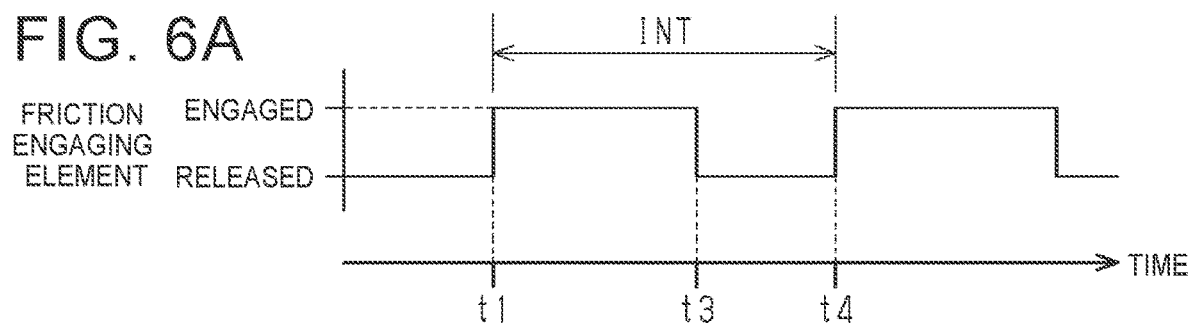
FIG. 6A is a timing chart showing a state of the friction engaging element.
Figure 6B:
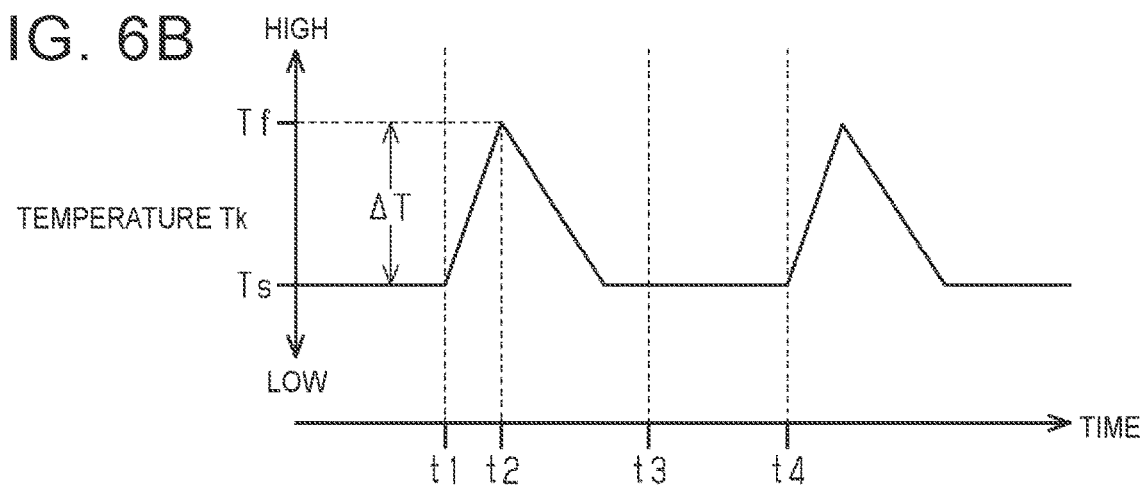
FIG. 6B is a timing chart showing a temperature change in the friction engaging element when the shifting interval is long.

(ii) As shown in FIG. 6A and FIG. 6B, with the start of the shifting to a certain shifting stage n at time t1, the engagement of the friction engaging element establishing the shifting stage n is started, and then the temperature Tk of the friction engaging element gradually increases from the temperature Ts at the start of engagement. Then, when the engagement is completed at time t2, the temperature Tk has risen by the above-mentioned rising temperature ΔT to reach the temperature Tf at the completion of the shifting.

After the engagement is completed at time t2, the temperature Tk decreases through cooling with hydraulic oil or the like, and eventually converges to a constant temperature. Then, when the shifting to another shifting stage different from the shifting stage n is started at time t3, the friction engaging element establishing the current shifting stage n is released. After that, when the shifting to the shifting stage n is started again at time t4, the engagement of the friction engaging element establishing the shifting stage n is started.

Figure 7:
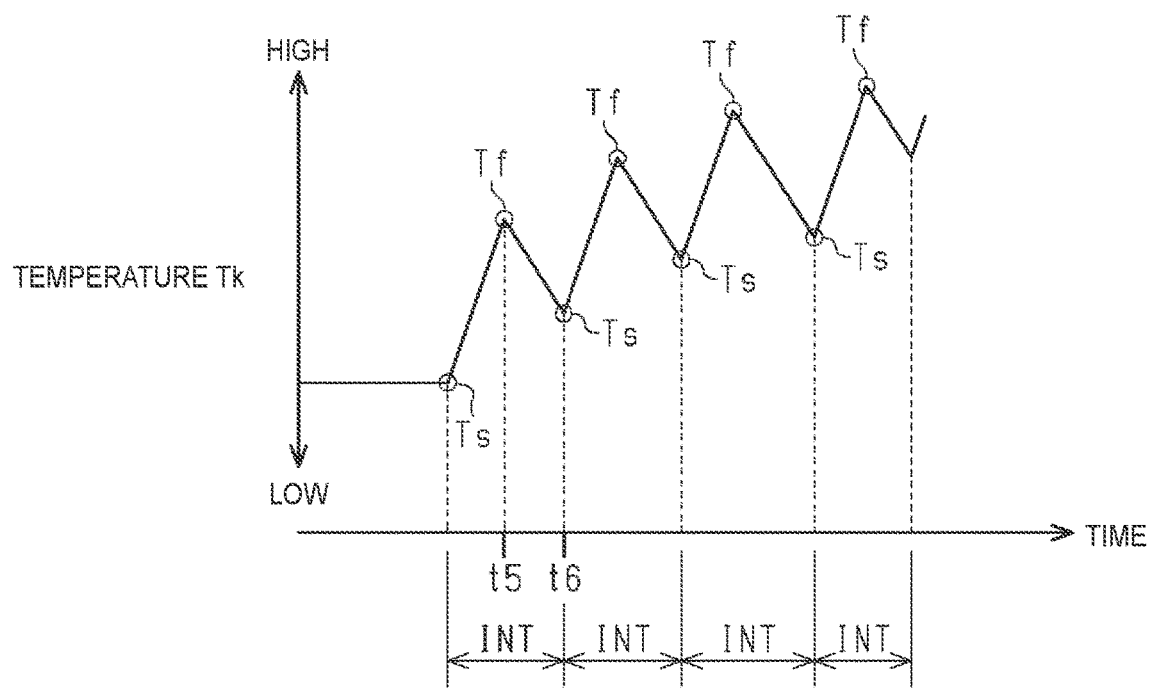
FIG. 7 is a timing chart showing a temperature change in the friction engaging element when the shifting interval is short.

As shown in FIG. 7, when the shifting interval INT is shortened by repeating such shifting within a short period of time, the engagement of the friction engaging element may be started again while the temperature of the friction engaging element is decreasing after the engagement is completed (for example, from time t5 to time t6 shown in FIG. 7). In this case, as compared with the case where the shifting interval INT is long and the engagement is started again from the state where the temperature of the friction engaging element has converged to a constant temperature as shown in FIGS. 6A and 6B, since the engagement is started at time t6 from the state where the temperature Ts of the friction engaging element at the start of the engagement is high, the temperature of the friction engaging element at the time of the shifting is also high, and thus the temperature Tf at the completion of the shifting is also high. When the shifting interval INT is different in this way, the temperature Ts of the friction engaging element at the start of the engagement is different, so that the temperature Tk of the friction engaging element at the time of the shifting is also different.

In this regard, in the present embodiment, since the input variables include a time variable indicating the shifting interval INT, the temperature Tk of the friction engaging element is calculated in consideration of the influence of the shifting interval INT on the temperature Ts of the friction engaging element at the start of the engagement. Therefore, the temperature Tk can be calculated with higher accuracy as compared with the case where the time variable is not included in the input variables.

(iii) The higher the relative rotation speed Nr between the first plate and the second plate of the friction engaging element that rotate relative to each other, the larger the heat generation amount of the friction engaging element. Further, the higher the hydraulic pressure supplied to the friction engaging elements during the shifting, the larger the heat generation amount of the friction engaging elements. Thus, in the present embodiment, the speed variable indicating the relative rotation speed Nr related to the amount of heat generated in the friction engaging element during the shifting and the hydraulic pressure variable indicated by the hydraulic pressure command value P* are used as heat amount variables, and these heat amount variables are input to the mapping defined by the mapping data DM to calculate the temperature Tk of the friction engaging element. Therefore, the temperature Tk of the friction engaging element can be estimated accurately.

(iv) When the temperature of the hydraulic oil changes, the atmospheric temperature of the friction engaging element and the cooling effect of the hydraulic oil change, so that the heat generation amount of the friction engaging element changes. In this regard, in the present embodiment, since the oil temperature Toil as an oil temperature variable indicating the temperature of the hydraulic oil is included in the heat amount variables, the temperature Tk is calculated in consideration of the influence of the temperature of the hydraulic oil on the heat generation amount. Therefore, the temperature Tk can be calculated with higher accuracy as compared with the case where the oil temperature variable is not included in the heat amount variables.

(v) In the present embodiment, the hydraulic pressure command value P* is variably set in accordance with the output torque of the prime mover mounted on the vehicle VC. When the hydraulic pressure is variably set in accordance with the output torque, the magnitude of the output torque is related to the heat generation amount of the friction engaging element. In this regard, in the present embodiment, since the above heat amount variables include the accelerator operation amount ACCP as a torque variable indicating the output torque of the in-vehicle prime mover, the temperature Tk is calculated in consideration of the influence of the output torque on the heat generation amount. Therefore, the temperature Tk can be calculated with higher accuracy as compared with the case where the torque variable is not included in the heat amount variables.

The present embodiment can be modified to be implemented as follows. The present embodiment and modifications described below may be carried out in combination within a technically consistent range.

In the above embodiment, the temperature Tk is calculated during the shifting. In addition, time-series data of the above input variables is acquired during the shifting. The temperature Tk of the friction engaging element at the time of the completion of the shifting may be calculated by inputting the acquired time-series data into the mapping after the shifting is completed.

The time variable among the input variables may be omitted. Further, other variables related to the temperature of the friction engaging element may be added to the input variables. Of the heat amount variables, at least one of the oil temperature variable and the torque variable may be omitted. Further, other variables related to the heat generation amount of the friction engaging element may be added to the heat amount variables.

The activation function of the above mapping is an example, and other functions may be adopted. As the neural network, a neural network having one intermediate layer is exemplified, but the number of intermediate layers may be two or more.

As the neural network, a fully connected forward propagation type neural network is exemplified, but the neural network is not limited to this. For example, as the neural network, a recurrent neural network may be adopted.

The function approximator as the mapping may be a regression equation. This corresponds to the above neural network having no intermediate layer. The friction engaging element for which the temperature Tk is calculated is the friction engaging element for establishing the shifting stage of the automatic transmission 26, but another friction engaging element may also be used. For example, a lockup clutch provided in the torque converter may be used. Further, the friction engaging element may be a clutch mounted on a vehicle including an internal combustion engine and a motor generator to switch a torque transmission state from the internal combustion engine to the drive wheels.

The vehicle VC is equipped with a communication device. The vehicle VC and the external data analysis center can communicate with each other via the communication device and the external network. The data analysis center includes a CPU, a ROM, a storage device, and a communication device. The CPU of the data analysis center may execute the calculation process described above. In this case, the calculation load of the CPU 42 of the vehicle VC can be reduced as compared with the case where the CPU 42 of the vehicle VC executes the calculation process described above.

The execution device is not limited to an execution device that includes the CPU 42 and the ROM 44 and executes software processing. For example, the execution device may include a dedicated hardware circuit (for example, an application specific integrated circuit (ASIC), etc.) that executes hardware processes in place of at least part of the software processes executed in the above embodiment. That is, the execution device only needs to have any of the following configurations (a) to (c): (a) a configuration including a processing device that executes all of the above processes according to a program and a program storage device such as a ROM for storing the program; (b) a configuration including a processing device that executes part of the above processes according to a program, a program storage device, and a dedicated hardware circuit that executes the remaining processes; and (c) a configuration including a dedicated hardware circuit that executes all of the above processes. Here, the above configurations may have a plurality of software execution devices including a processing device and a program storage device and a plurality of dedicated hardware circuits.

The vehicle VC is not limited to series/parallel hybrid vehicles. For example, the vehicle VC may be a series hybrid vehicle or a parallel hybrid vehicle. The vehicle VC is not limited to a vehicle that includes an internal combustion engine and a motor generator as an in-vehicle prime mover. For example, a vehicle having an internal combustion engine but not having a motor generator may be used, or a vehicle having a motor generator but not having an internal combustion engine may be used.

What is claimed is:

1. A temperature estimation device for a plurality of friction engaging elements that are applied to a vehicle provided with a transmission, the plurality of friction engaging elements operating with hydraulic pressure, the temperature estimation device estimating a temperature of the plurality of friction engaging elements at a time of shifting of the transmission, the temperature estimation device comprising:
    a storage device configured to store mapping data that defines a mapping, the mapping including:
        as an input variable:
            a heat amount variable indicating an amount of heat generated by the plurality of friction engaging elements during the shifting of the transmission,
            a shifting variable indicating the plurality of friction engaging elements to be engaged at the time of the shifting of the transmission, and
            a time variable indicating a shifting interval, the shifting interval being a time from a previous engagement start timing of the plurality of friction engaging elements for which the temperature is calculated to a current engagement start timing; and
        as an output variable:
            the temperature of the plurality of friction engaging elements at the time of shifting the transmission; and
    an execution device configured to execute an acquisition process of acquiring a value of the input variable and a calculation process of inputting the value of the input variable acquired by the acquisition process into the mapping to calculate a value of the output variable.

2. A temperature estimation device for a plurality of friction engaging elements that are applied to a vehicle provided with a transmission, the plurality of friction engaging elements operating with hydraulic pressure, the temperature estimation device estimating a temperature of the plurality of friction engaging elements at a time of shifting of the transmission, the temperature estimation device comprising:
    a storage device configured to store mapping data that defines a mapping, the mapping including:
        as an input variable:
            a heat amount variable indicating an amount of heat generated by the plurality of friction engaging elements during the shifting of the transmission, the heat amount variable including:
                a speed variable indicating a relative rotation speed of members of the plurality of friction engaging elements that rotate relative to each other during the shifting of the transmission, and
                a hydraulic pressure variable indicating the hydraulic pressure supplied to the friction engaging elements during the shifting of the transmission, and
            a shifting variable indicating the plurality of friction engaging elements to be engaged at the time of the shifting of the transmission; and
        as an output variable:
            the temperature of the plurality of friction engaging elements at a time of shifting the transmission; and
    an execution device configured to execute an acquisition process of acquiring a value of the input variable and a calculation process of inputting the value of the input variable acquired by the acquisition process into the mapping to calculate a value of the output variable.

3. The temperature estimation device according to claim 2, wherein the heat amount variable includes an oil temperature variable that is a variable indicating a temperature of a hydraulic oil supplied to the plurality of friction engaging elements.

4. The temperature estimation device according to claim 2, wherein:
the hydraulic pressure supplied to the plurality of friction engaging elements is changed such that an increase in an output torque of a prime mover of the vehicle causes an increase of the hydraulic pressure; and
the heat amount variable includes a torque variable that is a variable indicating the output torque.

5. The temperature estimation device according to claim 4, wherein the torque variable is a command value of torque to be applied to a drive wheel of the vehicle.

6. The temperature estimation device according to claim 4, wherein the torque variable is an accelerator operation amount of the vehicle.

* * * * *